UNITED STATES PATENT OFFICE.

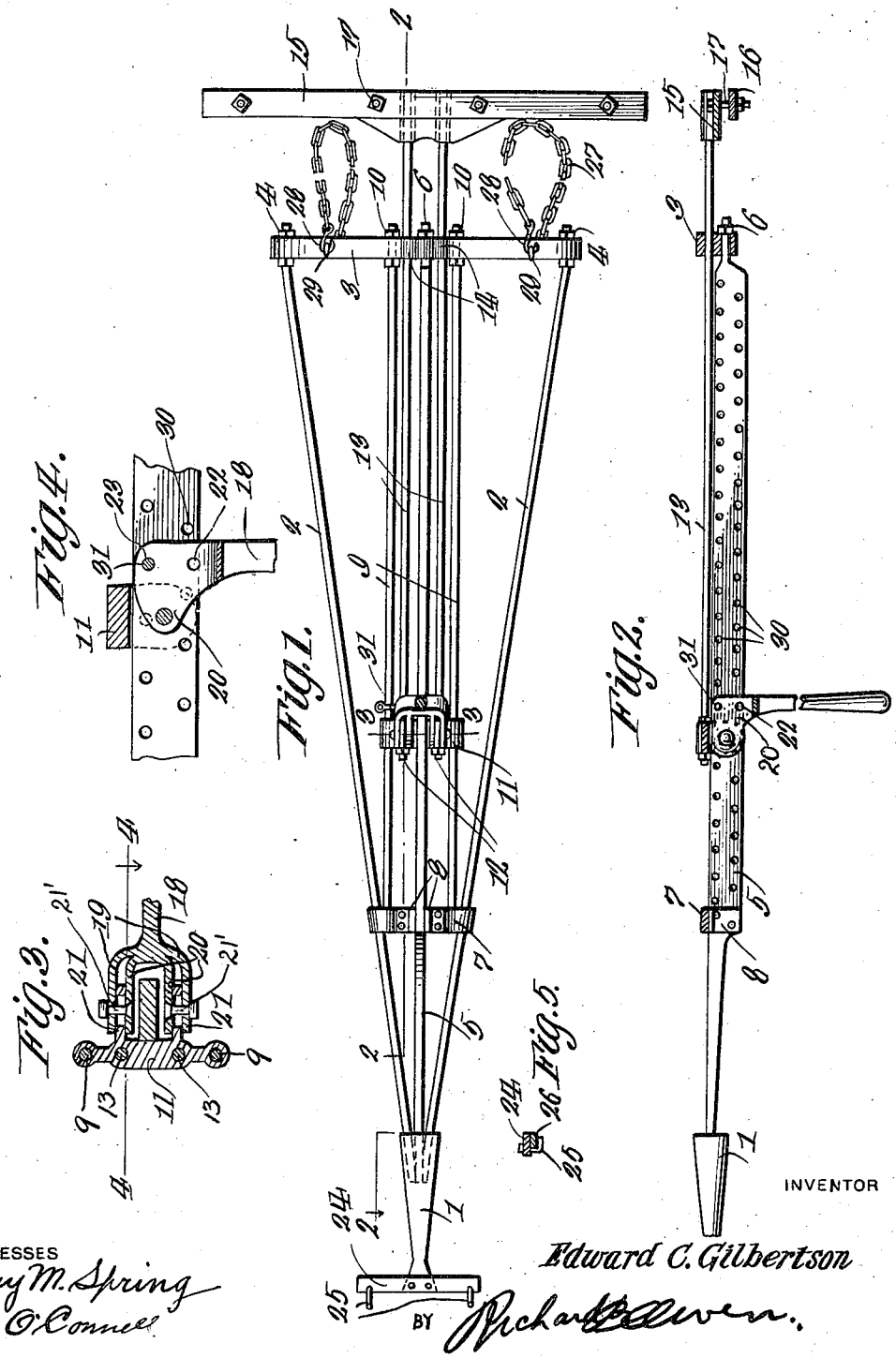

EDWARD C. GILBERTSON, OF NORMA, NORTH DAKOTA.

WIRE-STRETCHER.

1,269,072.  Specification of Letters Patent.  Patented June 11, 1918.

Application filed December 19, 1917. Serial No. 207,929.

*To all whom it may concern:*

Be it known that I, EDWARD C. GILBERTSON, a citizen of the United States, residing at Norma, in the county of Renville and State of North Dakota, have invented certain new and useful Improvements in Wire-Stretchers, of which the following is a specification.

This invention relates to certain new and useful improvements in wire stretchers.

The primary object of the invention is to provide a wire stretcher which includes a supporting frame adapted to be attached to a fence post, and a second wire clamping frame slidably arranged upon the supporting frame, the clamping frame being provided with means whereby the same may be moved relative to the supporting frame in a direction to stretch the wire.

A further object of the invention resides in the means provided for moving the clamping frame relative to the post engaging frame.

A still further object resides in the peculiar construction, combination and arrangement of the several parts of the invention whereby an efficient, easily operated and practical form of wire stretcher is produced.

Other objects of the invention, as well as the construction, operation and detailed arrangement of the several parts thereof will be more readily understood from the following description and accompanying drawings, in which drawings:—

Figure 1 is a side view of the invention as it appears in a position to be attached to the post.

Fig. 2 is a longitudinal sectional view taken on the line 2—2 of Fig. 1.

Fig. 3 is a transverse sectional view taken on the line 3—3 of Fig. 1.

Fig. 4 is a sectional view on the line 4—4 of Fig. 3 and

Fig. 5 is a view of a detail.

Referring to the drawings wherein I have shown the preferred embodiment, the numeral 1 designates a conical socket, in the larger end of which is soldered or otherwise secured the ends of a pair of diverging rods 2—2. These rods 2—2 which are preferably rounded, may be of any suitable length and have their opposite ends passing through the extremities of a transverse connecting bar 3 and secured in position by means of nuts 4. Between these rods is disposed a flat bar 5 which has its opposite ends reduced, one reduced end thereof being secured in the socket 1 while the other end passes through the central part of the bar 3 and is retained in position by a nut 6 or the like. This bar is provided with a double row of openings which are arranged in the staggered or alternate manner shown and are adapted to be used as hereinafter set forth.

Adjacent the socket 1 the rods 2—2 are connected or braced by means of a transversely extending casting 7, the opposite ends of which may be secured to the rods in any suitable way. Fastened to one side of this casting or plate 7 are a pair of L-shaped cleats 8 which engage the opposite sides of the flat bar 5 to further retain the same in position.

Arranged between the rods 2—2 and on opposite sides of the bar 5 are a pair of parallel guide rods 9 which are secured at one end to the casting 7 and have their opposite ends passing through the bar 3 and fastened as indicated at 10. A sliding frame is provided, which includes a casting or guide 11 adapted to be arranged between the guide rods 9 and having its opposite ends slidably secured to said rods preferably as indicated in Fig. 3. Passing through this guide member and secured as at 12 are a pair of spaced side rods 13, the opposite ends of which pass through raised bearings 14 formed in the bar 3 and are adapted to be secured to a transverse clamping bar 15. This bar 15 is adapted to be engaged with one side of the wire to be stretched and a similar bar 16 is adapted to be engaged with the opposite sides of the wire and clamped to the bar 15 by means of bolts 17 or other fastening means.

An operating lever indicated at 18, is provided with the ears 19 and 20 which are formed on the lever substantially as shown and are spaced apart to engage opposite sides of a pair of ears 21 extending from the casting 11. These ears 19 and 20 are connected together by means of suitable pivoted pins 21' which operate in elongated slots formed in the ears 21 in order to permit sliding movement of the ears 19 and 20 with respect to the ears 21 for a purpose which will be more clearly apparent hereinafter.

Secured to the reduced ends of the tapered socket 1 is a bar 24 which as shown is arranged at right angles to said socket and when the stretching frame is supported on a post is adapted to be engaged with one side of suitable brace wires. For engagement with the opposite sides of such wires a complementary bar 26 is provided and is adapted to be fastened to the bar 24 by means of the bent bolts 25. In connection with these clamping plates 24 and 26 it will be understood that the brace wires referred to may be attached at one end to one of the fence posts and at their opposite end to the corner post to one of which latter posts my device is adapted to be attached. It is not thought necessary to show such wires as it is obvious that the clamping bars when engaged with opposite sides of the same serve to hold the entire frame against swinging movement relative to the post upon which it is supported.

Secured to the bar 5 are a pair of chains 27 to the free ends of which are attached hooks 28 and in operation, these chains are passed about a fence post and engaged with eyes 29 positioned as shown. The wire to be stretched is then carried between the plates 24 and 26 secured to the end of the socket and clamped between the bars 16 and 17. To move the clamping frame in a direction to stretch the wire, we will assume that the lever 18 is in the position shown in Fig. 4. In this position, it will be seen that the openings 23 in the yoke has been alined with one of the openings in the bar 5 and through these alined openings is passed a pin 31 which provides a fulcrum for the lever. Using this pin as a fulcrum the lever is swung forwardly or to the right in order to bring the opening 22 into registration with the next opening in the bar 5 which latter opening 30 is arranged adjacent the opposite margin of the bar to the opening first engaged with the lever. The pin 31 is now removed from the opening 23 in the yoke and is inserted through the alined openings 22 and 30 and the lever is again fulcrumed to bring the openings 23 over the next succeeding opening in the bar. Thus it will be seen that as the lever is swung upon the traveling pivot pin 31 the guide 11 will be carried along the guide rods 9 in the direction of the bar 3 and clamping bars 15 and 16 will move with respect to the post engaging frame of the stretcher whereby to effect a stretching of the wire engaged therewith.

From the foregoing it is thought that the construction and operation of the preferred embodiment shown has been made clear, but I wish to state herein that the invention itself is capable of various changes relative to the construction and arrangement of the parts thereof and I reserve the right to make any such changes as come within the scope of the appended claims and do not depart from the spirit of the invention.

I claim:—

1. A wire stretcher including a stationary frame, a wire clamping frame slidably associated with said stationary frame, a perforated bar carried by said stationary frame, a lever carried by said sliding frame and straddling said perforated bar, said lever being equipped with openings adapted to be alined with the apertures in said bar, and a pin insertible through the alined openings in the bar and lever.

2. A wire stretcher, including a supporting frame adapted to be attached to a post, guides carried by the frame, a bar carried by the frame and provided with a double row of apertures one row being arranged in alternate relation to the other row, a wire clamping frame arranged to slide on said guides, a lever pivotally secured to said frame and equipped with a pair of spaced openings adapted to be alternately alined with the openings in the bar, and a pin adapted to be passed through the alined openings in the bar and lever to provide a fulcrum for the latter.

3. A wire stretcher, comprising a supporting frame including a socket, side members diverging outwardly from said socket, an elongated bar connecting the divergent ends of said side members and guide rods positioned between said side members, a sliding frame, including a guide arranged to slide on said guide rods, side members connected to said guide and arranged to slide through the bar connecting the side members of the supporting frame, a clamping bar connected to said sliding side members and means to move the sliding frame.

4. A wire stretcher, including a socket, a pair of diverging side members extending from said socket, an elongated bar connecting the divergent ends of said side member, guide rods positioned between said side members, a flat bar arranged between said guide rods and provided with a plurality of openings, a slide arranged on said guides, spaced rods connected to said slide and arranged to slide through the elongated bar, wire clamping bars secured to said sliding rods, a lever pivotally secured to said slide and equipped with spaced openings adapted to be alined with the openings in the flat bar, and a pin adapted to be passed through the alined openings in the bar and lever to provide a fulcrum for the latter.

5. A wire stretcher, including a socket, clamping plates carried by the socket and adapted to serve as a brace to be engaged with the wire, rods diverging outwardly from said socket, an elongated bar connecting the divergent ends of said rod, a flat bar, positioned between said rods and provided with a double row of alternately arranged openings, guide rods positioned on either side of said last named bar, slide arranged on said guide rods, ears extending outwardly from said slide, a lever provided with a yoke adapted to straddle said flat bar, said yoke provided with ears adapted to be pivotally secured to the ears extending from the guide and having openings formed therein adapted to register with the openings in the flat bar, a pin insertible through the alined openings of the lever and bar and a wire clamping frame movable with said slide.

6. In a wire stretcher, a frame comprising spaced side members, a flat bar positioned between said side members and provided with a plurality of openings extending along the entire length thereof, guide rods arranged on opposite sides of said bar, a slide movable on said rods, a lever pivotally secured to said slide and provided with openings adapted to register with the openings in said bar, a pin insertible through the alined openings in said bar and lever, and wire clamping means carried by said slide.

In testimony whereof I affix my signature in presence of two witnesses.

EDWARD C. GILBERTSON.

Witnesses:
P. W. DAHL,
H. H. DAHL.

Copies of this patent may be obtained for five cents each, by addressing the "Commissioner of Patents, Washington, D. C."